United States Patent [19]

Ford

[11] 4,073,198
[45] Feb. 14, 1978

[54] APPARATUS FOR CHANGING THE SPEED RATIO BETWEEN FIRST AND SECOND DISPLACEABLE MEMBERS

[75] Inventor: Michael Alan Ford, Maidenhead, England

[73] Assignee: Perkin-Elmer Limited, Beaconsfield, England

[21] Appl. No.: 716,301

[22] Filed: Aug. 20, 1976

[30] Foreign Application Priority Data

Aug. 21, 1975 United Kingdom ............... 34750/75

[51] Int. Cl.² .......................... F16H 3/08; F16H 1/00; G01D 15/18
[52] U.S. Cl. ........................................ 74/360; 74/365; 74/375; 74/625; 346/139 R
[58] Field of Search ................. 74/360, 363, 365, 354, 74/356, 625, 373, 374, 375; 346/33 A, 136, 139 R

[56] References Cited

U.S. PATENT DOCUMENTS

| | | | |
|---|---|---|---|
| 2,100,936 | 11/1937 | Bonn, Jr. | 74/363 |
| 2,647,411 | 8/1953 | Filocamo | 74/365 |
| 2,675,710 | 4/1954 | Ruhland | 74/375 |
| 2,701,479 | 2/1955 | Kuntny | 346/139 R X |
| 2,753,736 | 7/1956 | Mitchell | 74/625 |
| 3,084,563 | 4/1963 | Fischer | 74/375 |
| 3,145,578 | 8/1964 | Kampf | 346/136 UX |
| 3,162,058 | 12/1964 | Matthew | 74/354 |
| 3,183,735 | 5/1965 | Boreen et al. | 74/354 X |
| 3,229,540 | 1/1966 | Baranowski, Jr. | 74/354 |
| 3,280,651 | 10/1966 | Hermann | 74/365 |

Primary Examiner—Samuel Scott
Assistant Examiner—Lance W. Chandler
Attorney, Agent, or Firm—S. A. Giarratana; F. L. Masselle; E. T. Grimes

[57] ABSTRACT

In a device such as a spectrophotometer with an associated chart recorder in which the speed ratio between a first displaceable member and a second displaceable member may be selectively changed within a predetermined range of speed ratios, in a first embodiment of invention which is mechanical in nature, a number of gear trains in constant mesh with each other are provided to obtain the different speed ratios. Each of the gear trains has associated therewith a rotary disc with circumferentially even spaced apertures, the gear train obtaining an input from the first displaceable member by means of arms rotatable concentric with the discs, the arms carrying a pin adapted to enter into positive engagement with any one aperture, the number apertures depending on the scale served by the associated gear train. In a second, electrical embodiment equivalent operation is obtained by maintaining counts in counters of the position where the second displaceable member would be for each of the given scales along with maintaining a count of the actual position with comparator means used to bring the actual count into correspondence with the desired count when a scale change takes place.

22 Claims, 6 Drawing Figures

APPARATUS FOR CHANGING THE SPEED RATIO BETWEEN FIRST AND SECOND DISPLACEABLE MEMBERS

BACKGROUND OF THE INVENTION

This invention relates to apparatus for changing the speed ratio between a first displaceable member and a second displaceable member in general, and more particularly to an improved apparatus of this nature for use in a recording instrument in which a dependent variable is recorded on a medium such as a strip chart with respect to an independent variable the scale of which may be varied within a predetermined range while maintaining a phase relationship between the first and second displaceable members that is correct for the scale in use.

There are various applications in which the speed ratio between first and second displaceable members must be selectively changed. Typically, the displaceable members where such is required are shafts disposed for rotation. In other words, there is normally an input shaft and an output shaft with means between to alter the speed ratio between the two. However, there are applications where altering speed ratios must be available between two rectilinearly displaceable members. Such may be the case where each displaceable member is a rectilinear stepper motor and a range of speed ratios is provided between the two by controlling the frequency ratio of the drive pulses to one and the other motor.

The need for a device of this nature which is capable of maintaining a known phase or angular relationship between the two members can best be understood with reference to an example, particularly an example with regard to a recording instrument of the type noted above. In particular, the need for such a device in a spectrophotometer incorporating a chart recorder will be described. In such a device, there is a need to have a range of selectable abscissa scales. An instrument of this nature imposes certain phasing requirements which cannot be met by conventional gearboxes and other similar apparatus for changing speeds. It exemplifies the problem which the present invention solves and is a type of device where the present invention may be put to extremely good use. Although such devices primarily require the ability to provide scale expansion on the chart recorder, in some cases scale compression is also necessary.

In a spectrophotometer, the abscissa normally represents the wavenumber scan. The wavenumber scan value at any time from the scan start is represented by a corresponding rotational angle of a shaft, which is herein referred to as the wavenumber shaft. In terms of the present introduction, this is the first displaceable member. The wavenumber shaft can be coupled to drive a recording pen bridge which travels relative to a stationary chart. Alternatively, the chart can be driven relative to a stationary pen bridge, in both cases to generate the abscissa. In fact, these two modes are mechanically equivalent and for the purpose of understanding the present invention it is only necessary to consider the one case. Implementation in the other manner will readily suggest itself to those skilled in the art. For the purpose of the present invention, the latter mode in which the chart is in the form of a roll of perforated paper driven by a sprocketed shaft will be considered. The sprocketed shaft, in the terms of the present introduction, is the second displaceable member. Hereinafter it will also be referred to as the recorder shaft.

In an instrument having no abscissa expansion, it is typical for the recorder shaft to be displaced by the wavenumber shaft of the instrument through a fixed ratio. A phasing problem arises if a conventional gear box which provides a range of speed ratios is to be used interposed between a wavenumber shaft and the recorder shaft. This results from the fact that no readily identifiable rotational relationship is maintained between the two shafts when, after interrupting the wavenumber scan at some intermediate value between the instrument scan limits, by throwing the gearbox into a "neutral" position, and selecting a new speed ratio, the scan is resumed.

A plain recording chart or one provided with a series of uniformly spaced uncalibrated abscissa grid lines would normally be used where the operator intended to make use of the abscissa expansion facilities, since it would not be practical to include on the same chart a calibration for each of the abscissa expansions provided. The loss of an interpretable rotational relationship between the two shafts would mean that if the operator, for example, wished to try different values of abscissa expansions from a given wavenumber value corresponding to a chosen datum position on the chart (say, a mark made by the operator or a given abscissa grid line) he would have to reset the start point after each run by reversing the wavenumber drive until said given wavenumber value came up on the wavenumber dial and then manually positioning the chart at said datum position - two tiresome tasks neither of which can be easily performed with good repeatability.

The practical result of an almost inevitable introduction of an inconstant abscissa shift from each resumption of scan following the selection of a new abscissa scale, whether in repetitively scanning the same region of the spectrum at different abscissa expansions or in expanding certain regions only in the course of a run, is that the operator is completely at sea when it comes to reading off with reasonable accuracy the wavenumber corresponding to a spectral feature of interest to him, because the abscissa scales lack any repeatable phasing with the wavenumber dial and no definite value related to the expansion factor can therefore be assigned to the abscissa grid lines and, consequently to any subdivisions marked between grid lines.

Where a calibrated chart was to be used in the uncalibrated mode to expand certain regions of the spectrum under observation, the operator would encounter a similar phasing difficulty in passing from the uncalibrated to the calibrated mode (and vice versa).

In view of these various difficulties the need for an improved apparatus for changing the ratio of speed between two displaceable members, particularly the need for a device for changing speed ratio between a shaft such as the wavenumber shaft and a second shaft, such as the recorder shaft, in an instrument such as a spectrophotometer which is provided with scale expansion capabilities, becomes evident.

SUMMARY OF THE INVENTION

The present invention solves this problem and provides an apparatus for changing speed ratios while maintaining a proper phase relationship through apparatus comprising: a first displaceable member and a second displaceable member; speed transfer means for determining the rate of relative displacement between the two members so as to enable any one of a predetermined range of speed ratios to be established therebetween; means for selecting a desired speed ratio, and a phasing arrangement for enabling the relative displacement of the two displaceable members to be adjusted with repeatable accuracy before a new speed ratio is enabled so that, given a basic displacement step of the first displaceable member, successive displacement steps of said first displaceable member from a positional origin thereof, each representing the exact fraction or multiple of said basic displacement step that is determined by the selected scale expansion or compression, respectively, always correspond to successive equal and invariable displacement steps of the second displaceable member from a positional origin thereof no matter where the speed change takes place past the positional origin of said first displaceable member.

The apparatus outlined above can be better understood by referring specifically to its application to a spectrophotometer. If the basic displacement step of the first displaceable member is assumed to be the angle through which the input shaft of the changing speed apparatus, driven by the spectrophotometer wavenumber shaft, must be stepped from the position corresponding to the scan origin in order to scan successive 100-number intervals, and each of the successive, equal and invariable displacement steps of the second displaceable member is assumed to be the angle through which an output shaft of the apparatus for changing speed which is connected to the spectrophotometer recorder shaft, must be stepped in order to provide chart advancement by increments of 1 cm from the chart origin, for a 1X or normal operation, then, when the scale is expanded, each 1 cm increment on the chart must represent the exact fraction of the 100-wavenumber interval that is determined by the scale change introduced. Similarly, in the case of scale compression, each 1 cm increment must represent a multiple of the 100-wavenumber interval.

Thus, in the normal abscissa or X1 mode (X stands for times) each 1 cm increment would represent 100 wavenumbers. In the X2 mode, it would represent 100/2 = 50 wavenumbers; in the X4 mode, it would represent 100/4 = 25 wavenumbers, and so on. No phasing problem would arise if the wavenumber shaft was always returned to its positional origin before a scale change was effected, because it is clear that at the origin all scales must be coincident. The problem arises when the change is made past the scan origin.

In a possible embodiment which is mainly mechanical in nature the phasing arrangement includes one phasing means per selectable scale, each phasing means having a part referenced in motion to the first displaceable member and a part referenced in motion to the second displaceable member, said parts being so arranged that with the first displaceable member stationary at its positional origin engagement between the parts of each phasing means may only occur in correspondence of displacement, displaceable members each comprising such number of said equal invariable intervals of said second displacement steps as is required in the scale enabled by the said phasing means to make up a basic step.

In terms of the spectrophotometer referred to in which X1, X2 and X4 scales are provided, engagement is permitted in correspondence of the chart origin and thereafter at every 1 cm increment in X1, because in such scale 1 cm corresponds to 100 wavenumbers, which is the basic step. It is permitted every 2 cm interval in X2, since 1 cm represents 50 wavenumbers in X2 and two such increments are therefore required to make up a displacement interval corresponding to a 100-wavenumber basic step. Finally, it is permitted every 4 cm in X4. Since the phasing means effectively identifies the displacement interval which in the scale selected corresponds to the basic step, it follows that no matter where the wavenumber scan is stopped, the phasing means of the incoming scale, i.e., the new scale required, will enable the operator to find the point of engagement between its two parts corresponding to the wavenumber reading reached in the outgoing scale, i.e., the old scale superseded, as shown on the wavenumber dial. In other words, the operator is enabled to change scale at will and ensure that the abscissa is true reading to the scale selected.

To obtain the correct phasing, he may either reposition the chart while the instrument is not scanning or leave the chart alone and allow the instrument to scan until a driving connection with the chart is automatically established at the next occurring point of engagement of the phasing means enabling the new scale selected. The latter mode is bound to leave a gap in the scanned spectrum unless the point of engagement for the new scale happens to coincide with the point at which the scan in the outgoing scale was interrupted. The operator may maintain continuity, if he so wishes, by running back the instrument after the stop and then moving forward in the new scale, thus ensuring an adequate overlap between the two scales to maintain scan continuity.

Each phasing means comprises a part which is adapted to engage positively in any one of a series of equally spaced take-up areas of the other part so that the displacement relationship between the two displaceable members is adjusted exactly at each scale change.

In a specifically disclosed first embodiment using a mechanical arrangement and which is designed to be applied to a spectrophotometer, the first displaceable member and second displaceable member are the input and output shafts, respectively, of the apparatus for changing speed. The speed transfer means is a plurality of gear trains in constant mesh with one another. The phasing arrangement comprises a phasing means for each gear train, each gear train being allowed to idle unless a driving connection has been made by its associated phasing means. In the illustrated embodiment, one part of the phasing means is a rotary disc having circumferentially evenly spaced apertures. The other is in the form of a rotatable arm concentric with the disc and carrying a pin adapted to enter into positive engagement with any one aperture when allowed to do so. Naturally, the number of apertures varies depending on the scale served by the associated phasing means and whether or not the rotary arm or disc is directly connected to one or the other of the displaceable members.

In this first embodiment, a range of abscissa expansions is secured in such a manner that with the input shaft stationary at its positional origin successive equal increments of the output shaft (corresponding to, say, 1 cm increments of the chart as referred to earlier) from its positional origin cause successive take-up registration, i.e., correct juxtapositions for engagement of the pin with each of the successive apertures, to occur in each phasing means. Such a provision allows the output shaft to be phased at each scale change by shifting the chart (if a shift is in fact required) by no more than 1 cm, or, if the alternative phasing mode is chosen, by scanning forward a wavenumber interval not greater than that corresponding to 1 cm chart travel in the incoming scale, as will be more fully described below, wherein this desirable end is achieved by gearing down rather than gearing up the motion from the input shaft to the output shaft, thus securing at the same time the added advantage of gearing down manufacturing imperfections in the transferred motion.

A second embodiment which provides an electrical implementation of the present invention is also disclosed. In this embodiment, the speed transfer means are an electrical arrangement for enabling different frequency ratios of drive pulses to be established between two stepper motors, one of which includes the first displaceable member and the other the second displaceable member. The phasing means take the form of control circuits for holding one motor stationary, after a new scale factor has been selected, while the other is made to move in one or other direction until its monitored displacement is correct for the essential functional requirement of the present invention to be met at the incoming speed ratio. The two motors may naturally be either rotary or rectilinear.

In this electrical embodiment, the phasing of the two displaceable members at each scale change takes place automatically without the intervention of the operator and is so arranged as to require no more than one of said invariable displacement steps of the second displaceable member, this representing the electrical equivalent (except for its automatic action) of the provision referred to earlier in connection with the mechanical embodiment.

The present invention may be so applied to the abscissa scale-changing system of a spectrophotometer as to enable the abscissa scales to be brought into proper repeatable phasing with one another and the wavenumber scan, in such manner that regardless of the number of scale changes in recording a spectrum a spectral feature of interest may always be read off with a repeatable degree of accuracy, because the grid lines are made to read true to the abscissa scale or scales used in the course of a run and consequently any abscissa point falling between two consecutive grid lines can always be read off with an accuracy which when the chart is examined away from the instrument is limited only by the ability of the operator to subdivide by eye, perhaps with the aid of a ruled overlay, the small subdivisions marked between grid lines on the chart.

Although the present invention is disclosed primarily in connection with a spectrophotometer in which the first displaceable member is an input shaft and the second displaceable member an output shaft, it will be recognized by those skilled in the art that it is equally applicable for use in devices in which the motion is rectilinear rather than rotational. In fact, the equivalence between rotary and rectilinear motion or, for that matter, motion along any predetermined path, as far as the present invention is concerned, will become obvious from the detailed description below. Furthermore, as already alluded to above, although the present invention is described in terms of a chart which is driven with respect to a stationary pen bridge, it is equally applicable to a situation where the pen bridge is driven and the chart held stationary. Furthermore, although disclosed in terms of a spectrophotometer, it is equally useful in other types of devices in which proper phasing between two displaceable members must be maintained over a range of speed ratios.

BRIEF DESCRIPTION OF THE DRAWINGS

FIG. 6 is a diagram illustrating the manner in which the counters of FIG. 5 are reset when the spectrophotometer is first switched on.

DETAILED DESCRIPTION OF THE INVENTION

Figure 1:
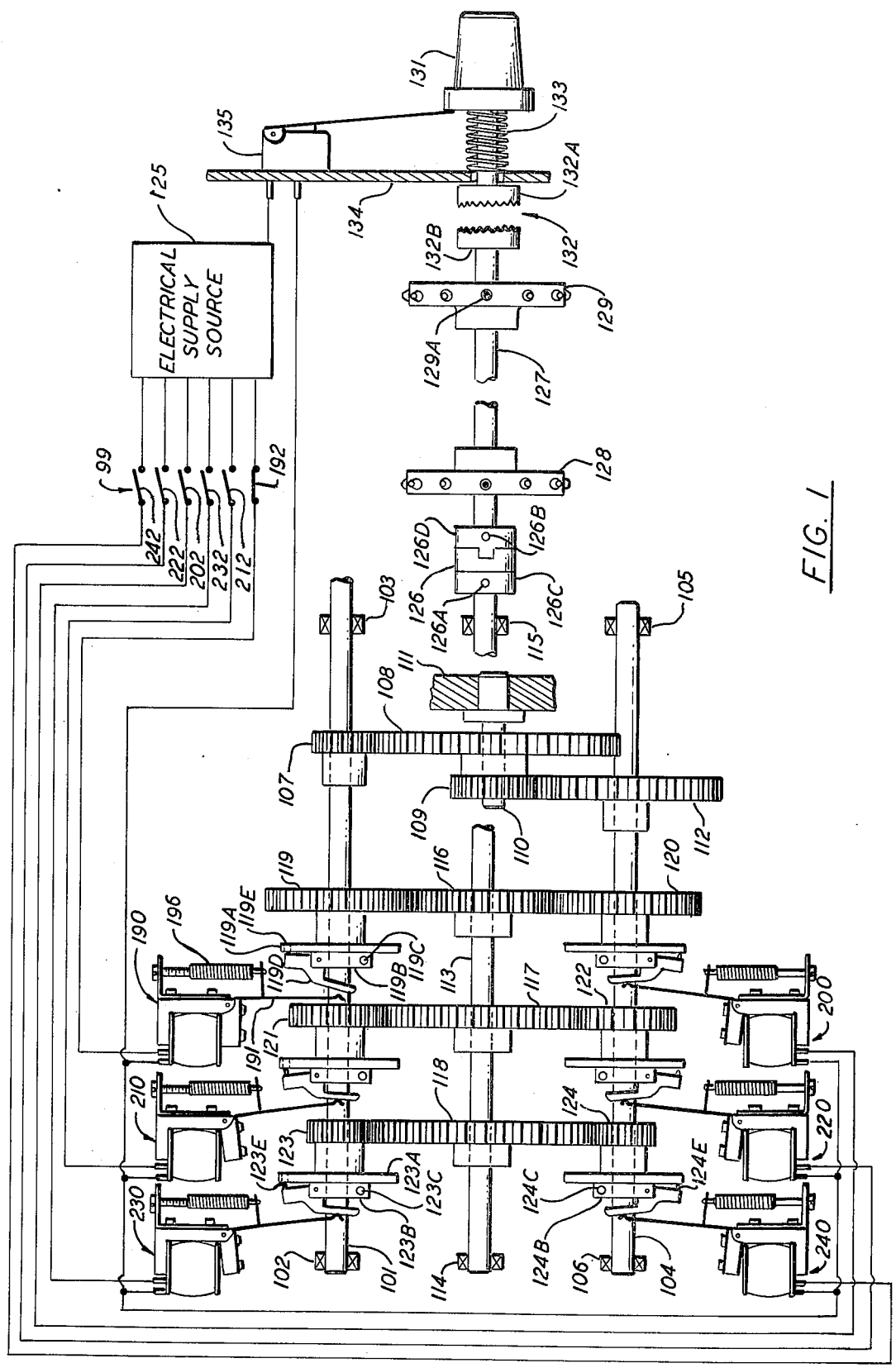
FIG. 1 is an elevation view partially in cross section and partially in electrical schematic form, illustrating a first embodiment of the present invention which is of a mechanical nature and which is adapted particularly to a spectrophotometer to permit selection of abscissa scales.

FIG. 1 illustrates a first embodiment of the present invention implemented mechanically. The illustrated embodiment is designed particularly for a spectrophotometer. It permits selecting any one of a number of abscissa expansions and one abscissa compression throughout the range of a high resolution infrared spectrophotometer designed to scan the region of the infrared spectrum extending between $4000 cm^{-1}$ and $200 cm^{-1}$ and present the scanned spectrum in the form of a trace drawn on a strip chart provided with abscissa grid lines (hereinafter in this specification simply referred to as grid lines) at 1 cm intervals. The embodiment of FIG. 1 exemplifies an important application of the present invention in which particular advantages thereof are obtained. Prior to describing FIG. 1 in detail, the general approach which it takes will be described. It should be kept in mind that although described in connection with a spectrophotometer, this general approach and the type of apparatus associated therewith, can be used in other types of devices.

As was previously noted, in order to permit repositioning with a minimum displacement of either the recorder shaft or the wavenumber shaft and to keep mechanical errors to a minimum, the present invention employs gearing down rather than gearing up through the speed transfer means. In other words, the rotary motion from the wavenumber shaft is to be geared down to the recorder shaft. In accordance with the embodiment of FIG. 1, the highest value of abscissa expansion is thus obtained through a 1:1 gear train, with the highest value being made an exact common multiple of the lower values required to give the full range desired, with each range derived through a separate gear train.

Typical abscissa expansions for a spectrophotometer are X2, x5 and X10. However, in some high resolution work certain closely spaced peaks in the spectrum of some compounds cannot alway be clearly resolved on the chart even at X10 without making the X1 presentation unduly extended. Thus, it is desirable to also have in an infrared spectrophotometer an expansion in excess of X10. The embodiment of FIG. 1 provides a X20 expansion, the next common multiple.

It is also desirable, for purposes of recording on small sizes of chart paper for filing purposes and the like, to have a compressed scale. Thus, the embodiment of FIG. 1 also provides an X0.5 scale in addition to the X1 scale and the expanded scales noted above. Table 1 below gives the scale provided by the apparatus of FIG. 1 and the gear ratios used to obtain them.

TABLE 1

| Abscissa Modes | Gear Ratios |
| --- | --- |
| X20 | 1:1 |
| X10 | 2:1 |
| X5 | 4:1 |
| X2 | 10:1 |
| X1 | 20:1 |
| X0.5 | 40:1 |

With these basic considerations in mind, reference may now be had to FIG. 1 which permits implementing the gear ratios. As shown thereon, a gearbox input shaft 101 rotatable in bearings 102 and 103 supported by the gear box frame (not shown), is in permanent driving relationship with a parallel layshaft 104, rotatable in frame-supported bearings 105 and 106. The drive is established through a 24-tooth pinion 107 pinned to input shaft 101, and 80-tooth spur gear 108 integrally extending into a 26-tooth spur gear 109, and thus forming with it a gear cluster, which is rotatable on a stub shaft 110 fixed to a gearbox frame part 111, and finally a 78-tooth spur gear 112 pinned to layshaft 104. It follows that the fixed speed reduction between input shaft 101 and layshaft 104 is exactly 10:1.

A gearbox output shaft 113, rotatable in frame-supported bearings 114 and 115, is positioned between input shaft 101 and layshaft 104, the longitudinal axis of the three shafts lying parallel to one another on a common plane from which the longitudinal axis of the stub shaft 110 is offset toward the viewer so that the spur gear 108 clears the output shaft 113.

Spaced output gears 116, 117 and 118, having 60, 80 and 96 teeth, respectively, are pinned to output shaft 113. Each output spur gear is in constant mesh with a spur gear mounted on input shaft 101 and an indentical spur gear mounted on layshaft 104. Spur gear 116 forms the X20 gear train in cooperation with another 60-tooth spur gear 119 (speed ratio of 1:1) on input shaft 101; it also forms the X2 gear train in cooperation with 60-tooth spur gear 120 (total speed reduction of 10:1) on layshaft 104. Similarly, the spur gear 117 forms the X10 gear train by meshing with 40-tooth spur gear 121 (speed reduction at 2:1) on input shaft 101, and the X1 gear train by meshing with 40-tooth spur gear 122 (total speed reduction of 20:1) on layshaft 104. Finally, spur gear 118 meshes with 24-tooth spur gear 123 (speed reduction of 4:1) on input shaft 101 and establishes the X5 gear train; it also meshes with 24-tooth spur gear 124 (total speed reduction of 40:1) on layshaft 104 to establish the X0.5 gear train. There are thus established 6 gear trains in constant mesh each comprising a total of 120 teeth.

Each of the gears meshing with the output shaft gears is free to idle (hereinafter referred to as idler gears wherever convenient) unless a rotary selectively operable positive clutch associated with it locks to its shaft. For example, the clutch associated with gear 119, on input shaft 101, includes a driven clutch member in the form of a coupling disc 119A integrally coaxial with gear 119, and a driving clutch member in the form of carrier block 119B which is clamped on the input shaft 101 by means of a locking screw 119C and carries a pivoted arm 119D supporting a coupling pin 119E for engaging a plurality of take-up apertures in coupling disc 119A which are equally spaced along a circle concentric with said disc as will be more fully described below in connection with FIGS. 2 and 3.

A spring (not shown in FIG. 1) tilts the pin carrying end of the arm 119D towards the coupling disc 119A when its other end is freed from the restraining pressure applied thereon by spring biased finger 191 of electromagnet 190 energized from a source of electrical supply 125 through press switch 192 that together with switches 212, 232, 202, 222 and 242 controlling electromagnets 210, 230, 200, 220 and 240, respectively, form a switch gang 99 designed to latch a switch at a time after first unlatching the switch that was latched before. (The manner in which the action of the gang switch 99 may be overridden for a specific purpose will be described below.)

In FIG. 1, the abscissa expansion switch 192 is shown closed, with the result that the electromagnet 190 is energized and the finger 191 is swung out of contact with arm 119D, its spring bias having been overcome by the magnetic pull. In other words, the restraining pressure referred to is absent and the coupling pin 119E is therefore able to ride (i.e., slip over) the working face of the coupling disc 119A as the input shaft 101 rotates, until it drops into the take-up aperture it next encounters on its circular travel and within a further very small angular displacement of input shaft 101 (during which no motion is transmitted to the coupling disc 119A because the diameter of the take-up apertures is deliberately made significantly greater than the diameter of the coupling pin 119E), it finally contacts the leading side of the take-up aperture and a driving connection is thus established. Naturally, if the coupling pin 119E happens to be in register with a take-up aperture when the electromagnet 190 is operated, it will simply drop in without first riding the face of disc 119A. In FIG. 1, the pin 119E is shown in actual engagement with a take-up aperture. Note that the microswitch 135 inserted in the lead from the supply 125 common to all electromagnets is assumed to be in the conductive state unless it is operated by depressing knob 131 for a purpose that will be described later. The construction, operation and electromagnetic selection of the rotary positive clutch associated with idler gear 119 also apply to the clutches associated with the remaining 5 idler gears, respectively, but it must be noted that the number of equally spaced take-up apertures is 12, 6 and 3 in the driven clutch members associated with idler gears 119, 121 and 123, respectively, and again 12, 6 and 3 in the driven clutch members associated with idler gears 120, 122 and 124, respectively, for reasons which will become evident in the following discussion particularly with respect to FIGS. 2-4.

Figure 2:
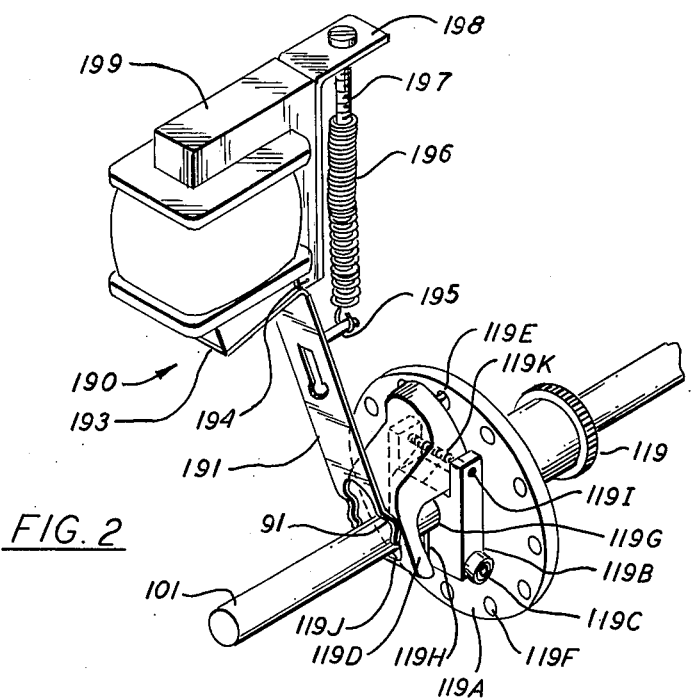
FIG. 2 is a detailed drawing of one of a plurality of the phasing means of the apparatus of FIG. 1.

FIG. 2 depicts in greater detail the construction and electromagnetic control of the rotary positive clutch cooperating with idler gear 119. It shows the coupling disc 119A, the carrier block 119B, the locking screw 119C, the pivoted arm 119D, the coupling pin 119E and the electromagnet 190, with its depending finger 191, which have already been generally introduced with reference to FIG. 1. The control switch 192 was also introduced but is not shown in FIG. 2.

The carrier block 119B, of generally parallelopiped configuration, is machined from solid brass, has a bore 119G through which the input shaft 1 passes and a split 119H for clamping the said block on the shaft by tightening the locking screw 119C, which tends to close the split. It supports the arm 119D pivoted on pin 119I spanning a U-shaped recess within which the fulcrum region of arm 119D is largely accommodated. One end of the arm 119D carries on the underside thereof the coupling pin 119E. The other end of the arm, forwardly offset relative to the front face of the carrier block 119B, is provided with a slot 119J sufficiently large to clear the input shaft 101 passing therethrough when the arm 119D is caused to pivot through a restricted angle around pin 119I.

In the relative positioning of arm 119D and disc 119A shown in FIG. 2, idler gear 119 and the disc 119A integral therewith are free to rotate around input shaft 101 and no drive can therefore be transmitted from input shaft 101 to the output shaft 113 shown in FIG. 1. Arm 119D is in fact depicted in a position in which the pin 119E is clear of the disc 119A. While the switch 192 (see FIG. 1) is off, and the electromagnet 190 is, therefore, de-energized, arm 119D is held in that position by the finger 191 extending from the armature 193 pivoted on pin 194 of electromagnet 190. The arm 191 is provided with a lug 195 to which one end of a tension spring 196 is secured, the other end being engaged by a tensioning screw 197 depending from a bracket 198 attached to the core 199 of the electromagnet 190, which core 199 is itself attached to a frame part (not shown) of the gearbox. The spring 196 acts therefore as a return spring urging the armature 193 away from the facing stationary magnetic pole of electromagnet 190 when the latter is de-energized.

The pull exerted by spring 196 on arm 191 causes a forked end 91 of arm 191 to depress the slotted end of arm 119D, the force applied by spring 196 being sufficient to overcome the action of a helical spring 119K which is mounted on pin 119I and is adapted to bias the end of arm 119D carrying coupling pin 119E toward coupling disc 119A. It follows that when electromagnet 190 is energized, the fork 91 moves away from the slotted end of arm 119D and the spring 119K causes pin 119E to bear against the disk 119A. In this position, the longitudinal axis of the contacting pin 119E lies on a circle which approximately bisects the apertures 119F. If we assume that screw 119C has in fact been tightened, rotation of input shaft 1 and, consequently, a carrier block 119B will cause pin 119E to slide over the disc 119A until it registers with one of the apertures 119F and drops in to establish a driving connection between input shaft 101 and idler gear 119. The connection is broken when a solenoid other than 190 is energized by pressing the appropriate switch button of the gang switch 99 (FIG. 1) which action will, as we know, automatically trip off the switch 192.

In the apparatus just described, each clutch has a disc such as the disc 119A with circumferentially evenly spaced take-up apertures and a pin such as pin 119E mounted at the end of a radial arm adapted to sweep the apertures for engagement with any permitted aperture by positive mechanical interference therewith. The coupling discs are integral in rotation with the fastest running gear of their associated gear train. Three of the radial arms are rotated by the input shaft and three by the layshaft. Since each 1 cm increment of chart travel is assumed to represent the scanning of a 100 wavenumber interval in the X1 mode, the same increment represents a 5 wavenumber interval in the X20 mode; a 10-wavenumber interval, in the X10 mode; a 20-wavenumber interval, in the X5 mode; a 50-wavenumber interval, in the X2 mode and finally a 200-wavenumber interval, in the X0.5 mode. Since 60 is divisible by 5, 10 and 20, the input shaft was arranged so that one complete revolution corresponds to the scanning of 60 wavenumbers. As a result, in the embodiment of FIG. 1, the X20 coupling disc must be provided with 60/5 = 12 apertures; the X10 coupling disc, with 60/10 = 6 apertures; and the X5 coupling disc, with 60/20 = 3 apertures. As to the remainder of the modes, bearing in mind the division by 10 between input shaft and layshaft, the 60 wavenumbers of the input shaft is reckoned as 600, so that the X2 coupling disc requires 600/50 = 12 apertures; the X1 coupling disc, 600/100 = 6 apertures and the X0.5 600/200 = 3 apertures.

Figure 3:
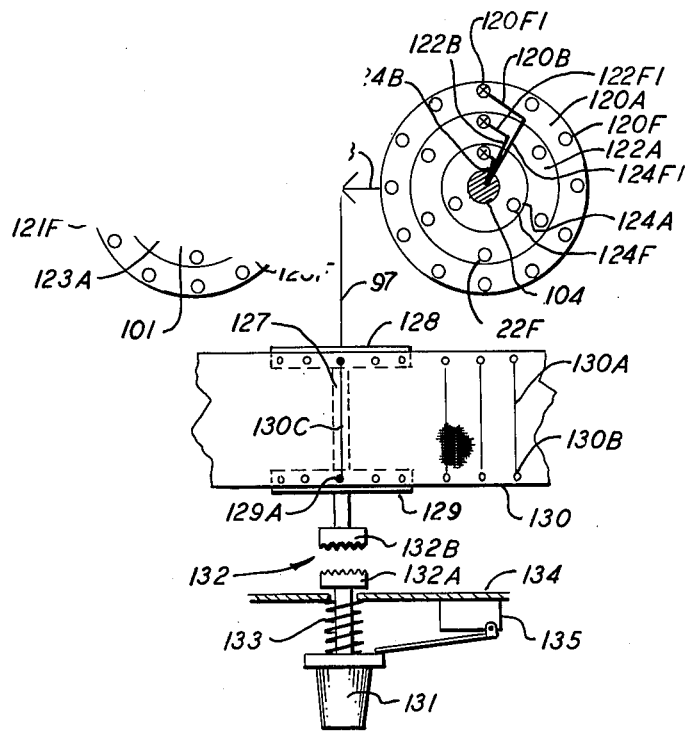
FIG. 3 is a diagram illustrating the initial lining up of a plurality of phasing means.

The manner in which the six positive clutches may be initially phased so that any one of them may be made to take up at the start of scan of the spectrophotometer, i.e., 4000cm$^{-1}$ will now be described. FIG. 3 is mainly a symbolical representation but whether the parts shown are symbolized or not they bear the same references as those of the corresponding real parts already described.

The coupling discs 119A, 121A and 123A, mounted on input shaft 101 (seen end on), are symbolized as concentric discs of decreasing diameter to enable the angular relationship between the respective take-up apertures 119F, 121F and 123F and the respective symbolized carrier blocks 119B, 121B and 123B to be clearly appreciated. Similarly for coupling discs 120A, 122A and 124A mounted on layshaft 104, take-up apertures 120F, 122F and 124F as well as carrier blocks 120B, 122B and 124B. The drive through the gear trains from input shaft 101 and layshaft 104 to recorder shaft 127 is symbolized by two lines in T-formation, 98 and 97. Sprockets 128 and 129 are fixed to shaft 127 (see also FIG. 1). Sprocket 129 is provided with a marked tooth 129A and is shown in engagement with a perforated chart 130 on which the wavenumber scale is not marked but grid lines 130A at 1 cm intervals are provided, each line bisecting a chart perforation 130B.

An arrangement for manually turning shaft 127 is also shown (see also FIG. 1) which comprises a knob 131 connected to one half 132A of a toothed clutch 132, the other half 132B being mounted on the end of shaft 127 next to sprocket 129. The clutch 132 is engaged by pushing knob 131 against the opposing action of spring 133 reacting on a frame part 134, when rotation of the knob 131 will enable the chart to be moved in either direction. Isolating microswitch 135, arranged to override the gang switch 99, becomes operative after the clutch 132 has engaged fully so that whichever of electromagnets 190, 210, 230, 200, 220 and 240 was energized at the time becomes de-energized, thus removing all driving connection between input shaft 101 (or layshaft 104) and shaft 127 and effectively placing the gearbox into "neutral".

The depth of the teeth on clutch parts 132A and 132B is such that, while full abutment of said parts causes microswitch 135 to break, a distinctly shallower engagement causes the said microswitch to make again while still ensuring satisfactory mechanical coupling between the said parts. The particular purpose of this arrangement will become apparent in the description below.

The first essential step in the phasing procedure is to lock the drive to input shaft 101 in correspondence of an accurately known wavenumber value. The scan start wavenumber is obviously suitable and it is assumed that the drive referred to has been locked in correspondence thereto. Now it is clear that at the start position, when a driving connection must be possible between the input shaft 101 and the recorder shaft 127 through any of the gear trains provided by the gearbox, there must be one take-up aperture in each coupling disc that is positioned relative to the coupling pin of the associated carrier block so that the pin is ready to drop straight in, i.e., a take-up registration must occur in each clutch. If the take-up apertures ready to be engaged can be made to line up at least approximately, the corresponding carrier blocks will need to be approximately in line. This has the advantage that the locking screws of the carrier blocks are more readily accessible because they are all facing the same way.

In FIG. 3, take-up apertures 119F1, 121F1 and 123F1 are each marked by a cross. In assembling the gearbox, the marked apertures are lined up. The symbols are used for the carrier blocks 119B, 121B and 123B are intended to convey that the carrier blocks are also approximately lined up but unlocked in readiness for the final angular adjustment relative to the supporting input shaft that will be presently described. Similarly for the marked take up apertures 120F1, 122F1 and 124F1 and carrier blocks 120B, 122B and 124B.

Furthermore, a grid line such as 130C of chart 130 is made to lie on a plane which approximately bisects the marked tooth 129A of sprocket 129 and is perpendicular to the plane of the paper. To this end, the grub screw 126A securing one half 126C of coupling 126 (see FIG. 1) to the output shaft 113 is released, the angular relationship between output shaft 113 and recorder shaft 127 is adjusted and the grub screw 126A is retightened. Grub screw 126B secures the other half 126D of coupling 126 to the recorder shaft 127.

Referring mainly to FIG. 1, unless otherwise indicated, the electromagnet associated with the X5 idler gear 123 is next energized (assuming that the power supply 125 has been switched on, of course) by operating press switch 232 to engage the take-up aperture 123F1 of coupling disc 123A (FIG. 3), slightly rotating carrier block 123B if necessary until a take-up registration is attained. Now the locking screw 123C is tightened, the sprocket 129 is urged by hand in a counter-clockwise direction to eliminate all backlash in the gearing, and the recorder pen is made to draw a line on the chart paper 130. (FIG. 3).

The chart paper is then turned around and with the same pair of chart perforations as before another line is drawn. If the two lines coincide, grid line 130C bisects the marked tooth 129A and if they do not, the coupling from output shaft 113 to recorded shaft 127 is released and the sprockets are re-phased until coincidence of the drawn lines is obtained. It has now been ensured that on the X5 abscissa expansion, the drive from input shaft 101 is engaged at the scan start wavenumber with the pen poised over grid line 130C now representing the scan start on the chart 130.

Once a scan start datum through the X5 gear train has been established, the remainder of the procedure is simply directed to ensure that the other gear trains are phased with respect to this datum.

To complete the phasing procedure, the 230 electromagnet is de-energized and the 240 electromagnet is energized thus enabling the coupling pin 124E to engage the crossed aperture 124F1 in the 124A coupling disc (FIG. 3). Carrier block 124B is lightly clamped to layshaft 104 by means of locking screw 124C and the sprocket 129 is grasped by the hand and turned a few degrees in a clockwise direction against frictional resistance of the carrier block 124B slipping on the locked layshaft 104, after which it is turned back. In turning sprocket 129 back, a slight lost motion will be felt before the pin 124E contacts the driving side of the crossed aperture. Once the lost motion has been taken up, the frictional resistance between carrier block 124B and layshaft 104 will again be felt. The reverse rotation of sprocket 129 is continued until the recording pen is exactly coincident with the datum line previously drawn on the chart, after which the screw 124C is tightened so that the carrier block 124B is securely clamped to the layshaft 104. The X0.5 gear train is now properly phased and the same operation is repeated for the 4 gear trains that still have to be dealt with.

Once the 6 gear trains have been properly phased at 400cm$^{-1}$, the constant mesh relationship effectively existing therebetween and the provision of equally spaced take-up apertures in each coupling disc as described above will ensure that in operation, a gear train can only be engaged whenever the rotational relationship between input shaft and output shaft is such that after the engagement successive grid lines represent successive 100−wavenumber intervals from the scan origin at 400cm$^{-1}$ or successive wavenumber intervals each of which is the exact fraction of 100-wavenumbers given by the abscissa expansion selected, (or the exact multiple in the case of the X0.5 scale) depending on whether the incoming mode is X1 or another mode within the design range. This can be illustrated with the aid of FIG. 4, in which is reproduced the symbolized layout of the coupling discs 119A, 121A and 123A shown in FIG. 3, substituting however, radial marks for positions occupied by the take-up apertures in FIG. 3. An outer spiral wavenumber scale, which for convenience is terminated at 3925cm$^{-1}$ and which must be in fact imagined as extending to 200cm$^{-1}$ is also added.

It will be noted that the wavenumber scale shows divisions at 5-wavenumber intervals. As established above, each division represents a grid line in the X20 mode; every other division, in the X10 mode; every fourth division, in the X5 mode. In other words, considering a complete revolution of the input shaft from the 4000cm$^{-1}$ mark, grid lines occur in the X20 mode at 4000cm$^{-1}$, 3995cm$^{-1}$, 3990cm$^{-1}$ and so on up to and including 3945cm$^{-1}$; in the X10 mode, they occur at 4000cm$^{-1}$, 3990cm$^{-1}$, 3980cm$^{-1}$, 3970cm$^{-1}$, 3960cm$^{-1}$; in the X5 mode, they occur at 4000cm$^{-1}$, 3980cm$^{-1}$, and 3960cm$^{-1}$.

Figure 4:
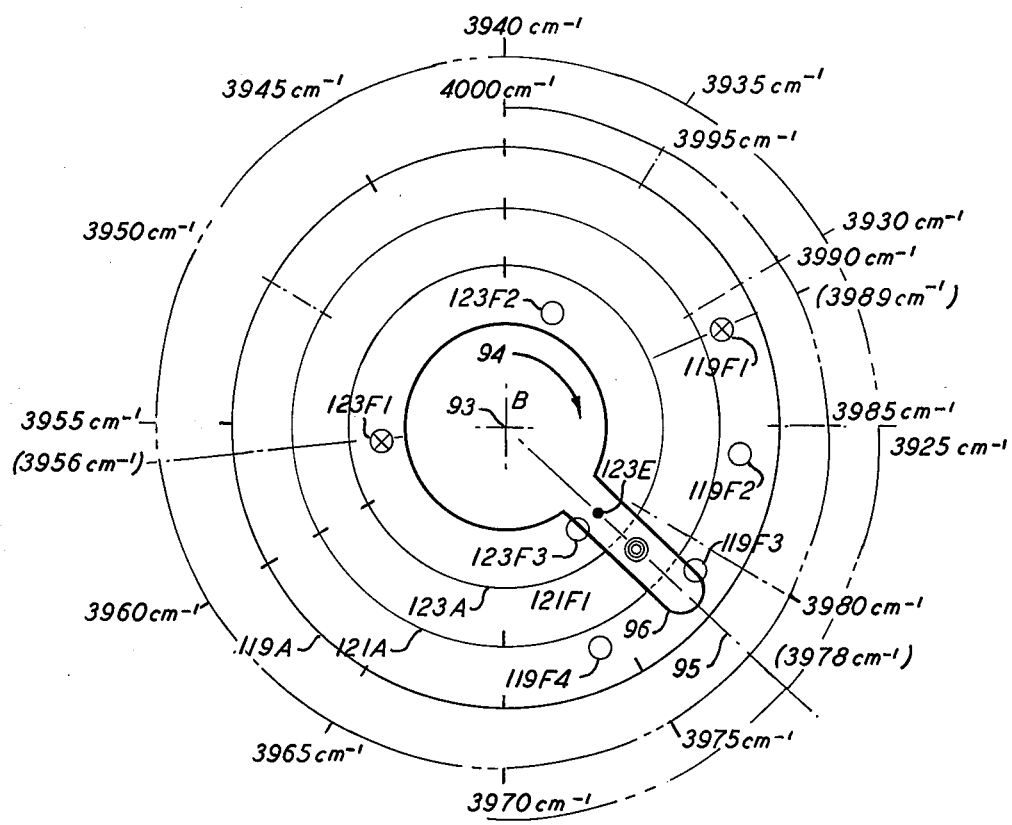
FIG. 4 is a diagram illustrating interrelated functions of the plurality of phasing means.

In FIG. 4, there is shown in a very diagrammatic manner the result of scanning from 4000cm$^{-1}$ to 3978cm$^{-1}$, i.e., 22 wavenumbers in the X10 mode. Radially projecting arm 96 at 3978cm$^{-1}$ represents an idealized line up of the carrier blocks 119B, 121B and 123B (FIG. 3). A line 95 along the longitudinal axis of symmetry of arm 96 intersects the crossed take-up aperture 121F1 at its new position (compared with the position shown in FIG. 3) after the scanning of 22 wavenumbers has stopped. Similarly, take-up aperture 191F1 is shown at 3989cm$^{-1}$ mark, i.e., at the angular position corresponding to 11 wavenumbers from the start, since the 2:1 speed reduction between input shaft and output shaft introduced by the X10 train is unaltered by the idling X20 gear train providing a 1:1 speed ratio between the output shaft and the input shaft; and take-up aperture 123F1 is shown at the 3956cm$^{-1}$ mark, i.e., at the position corresponding to 44 wavenumbers from the start, because of the 2:1 reductions of the X10 gear train modified by the 1:4 step up of the idling X5 gear train giving an overall 1:2 step up. Also shown are three take-up apertures ahead of take-up aperture 119F1, i.e., take-up apertures 119F2, 119F3, and 119F4, and take-up aperture 123F3 and 123F2 trailing behind 123F1. The arrow 94 shows the direction of rotation, around the axis 93, of both the arm 96 and the coupling discs 119A (X20), 121A (X10) and 123A (X5).

If it is now desired to select either the X20 or the X5 abscissa expansion mode, two options are open. It is possible to either select the mode required and resume the scan or select the mode, manually position the chart until a take-up register occurs, and then resume the scan. Considering the first method and assuming selection of the X5 mode, a take-up registration will clearly occur when the coupling pin 123E (FIGS. 1 and 4) registers with the take-up aperture 123F3 after the carrier blocks symbolized at 96 have reached the 3976cm$^{-1}$ mark, which clearly denotes the nearest take-up register for phasing in the X5 mode, as may be readily appreciated by observing that in this mode, the next ordinate grid line occurs at 3960cm$^{-1}$, which is exactly divisible by 20 so that the spacing between this grid line and the one that preceded it must represent one of the successive 20-wavenumber intervals that have occured from the scan origin at 4000cm$^{-1}$ to the 3960cm$^{-1}$ mark. Since the chart calibration only holds for the X1 mode, it would have been possible to manipulate the knob 31 (FIG. 3) to seek another take-up registration by engaging either of the remaining two apertures 123F1 and 123F2 and, provided the reading appearing on the wavenumber dial was marked at the spot where scan was resumed, each successive grid line would still mark successive 20-wavenumber intervals from the scan origin or stated differently each grid line passed from the resumption of scan would represent an exact multiple of 20 wavenumbers. Naturally, when switching from an expansion mode to the X1 mode, it is necessary to engage the take-up aperture occurring just before the wavenumber dial reading. This is done by returning the chart upscan past the reading until engagement takes place.

It will be noted at once that the phasing method described may involve a significant break in the wavenumber scan continuity and at the lower values of abscissa expansion the waiting time before the scan is resumed may be inconveniently long. The second method is generally preferred, since it enables scan continuity to be maintained and avoids delay in the resumption of the scan. Again, assuming that the X5 mode has been selected, the chart is advanced manually until the 123F2 take-up aperture registers with the coupling pin 123E which remains stationary at the 3978cm$^{-1}$ mark. To this end, the operator first depresses the knob 131 fully to cause the microswitch 35 to break and consequently the solenoid 210 to become de-energized. This places the gear box into "neutral". He then allows the knob 131 to pull back sufficiently for the microswitch 135 to make again and consequently for the already selected solenoid 230 to become energized so as to allow the pin 123E to bear resiliently against the associated coupling disc. He next advances the chart slowly. The moment the spring biased coupling pin 123E drops into take-up aperture 123F2, the motion becomes restrained and the operator knows that the X5 mode has taken over.

As long as the coupling pin associated with the outgoing gear train has disengaged just before the coupling pin associated with the incoming gear train is preconditioned for engagement at the next occuring take-up registration point, the initial phasing of the gear trains established at the scan origin is maintained. If the rotational relationship is deliberately upset by disabling all the coupling pins and displacing the chart by several centimeters, it can be restored by phasing up the chart by means of the manual control 131 (FIG. 1).

To illustrate the great convenience to the analyst resulting from the application of the present invention to a spectrophotometer, assume that he has performed the run described with reference to FIG. 4, continued to scan in X5 up to 3930cm$^{-1}$, stopped the instrument and removed the chart for a detailed study. He next finds that the trace shows an interesting peak just downscan of the second grid line passed from the point at which the X5 mode became operative. He wishes to read the wavenumber corresponding to the peak. He knows that through the phasing procedure that preceded the scale change, all grid lines encountered in the X5 mode just read true to that mode, i.e., they must each represent an exact multiple of 20 wavenumbers. The first 20-wavenumber block obviously occurred at 3980cm$^{-1}$, just before the scale change, so that the next grid line encountered in X5 must represent 3960cm$^{-1}$ and the one after that 3940cm$^{-1}$. Another grid line in X5 does not occur until the 3920cm$^{-1}$ mark is reached. The analyst is therefore immediately aware that the peak of interest is at a lower wavenumber than 3940cm$^{-1}$ but not as low as 3920cm$^{-1}$. All he has to do now is to read off the subdivisions normally marked on a gridded chart between consecutive grid lines. Assume that the subdivisions occur at 2mm intervals. If, for example, the peak was found in correspondence of the second subdivision, the wavenumbers passed in X5 from the second grid line would be $20 \times 2/5 = 8$. So the wavenumber reading of the peak is $3940 - 8 = 3032cm^{-1}$.

Figure 5:
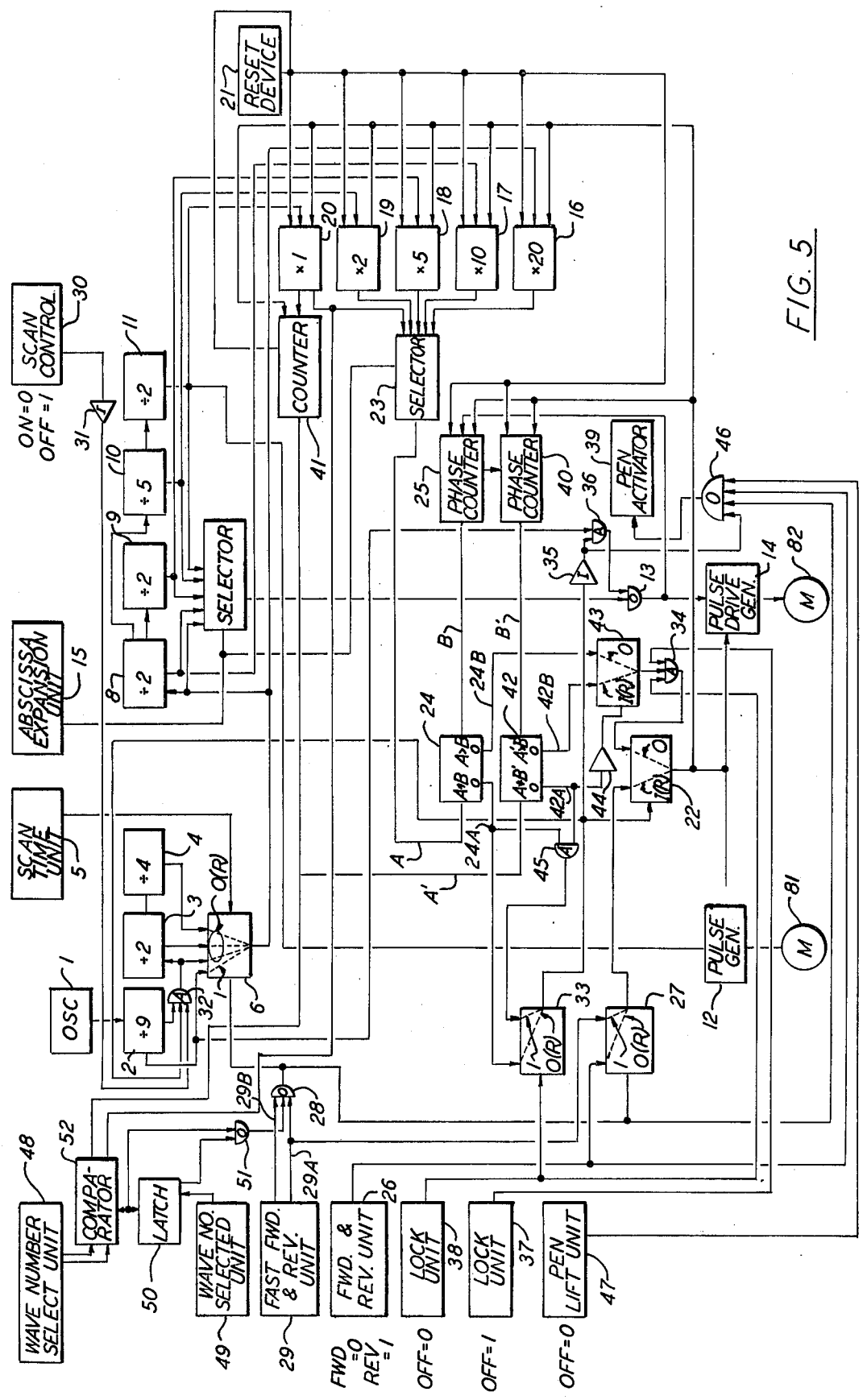
FIG. 5 is a block-logic diagram illustrating a second, electrical embodiment of the apparatus of the present invention for permitting the selection of abscissa scales in a spectrophotometer.

FIG. 5 is a block-logic diagram illustrating a second embodiment of the present invention, realized by electrical means. In this figure, a 5.6 kHz oscillator 1 feeds into a frequency divider 2 providing a division by 9. Successive further divisions by 2 and 4 are provided by dividers 3 and 4, respectively. A user-operated SCAN TIME control unit 5 is adapted to deliver one of three possible command inputs to the selector 6 to which each of the divided frequencies is extended, the command input actually enabled by the user determining which of the divided frequencies is passed through to the output of selector 6. The frequency emerging from selector 6 thus selected by the user is fed both to the selector 7 and the divider 8, in which it is divided by 2. The output frequency of divider 8 is further divided by 2 in divider 9 and by 5 in divider 10. The result of this latter division is divided by 2 in divider 11. Through the four successive divisions referred to, an effective division by 20 is available at the output of divider 11. The output frequency of each of dividers 8 through 11 is separately extended to selector 7. The output frequency of divider 11 is additionally extended to the pulse generator 12, whereat it represents the timing frequency for the generation of drive pulses to the wavenumber stepper motor SM1 correspondingly to the selection made by the user through the SCAN TIME control unit 5.

Through an OR gate 13 (the purpose of which will be described later), the drive pulse generator 14 receives from selector 7, commanded by the user-operated ABSCISSA EXPANSION unit 15, the output frequency that will time the generation of drive pulses to the chart stepper motor SM2 corresponding to the abscissa expansion selected by the user. Unit 15 is arranged for press button operation.

The embodiment of FIG. 5 provides selectable scan times of 6, 12 and 48 minutes and abscissa scale expansions of X2, X5, X10 and X20, in addition to normal scale or X1, of course. It is associated with a spectrophotometer designed to scan the full infrared spectrum from 4000cm$^{-1}$ to 200cm$^{-1}$ and to produce a record thereof in the form of a trace drawn on a calibrated chart 56cm in length, of which the first 20cm cover the range 4000cm$^{-1}$ to 2000cm$^{-1}$ and the remaining 36cm of the range from 2000cm$^{-1}$ to 200cm$^{-1}$, the wavenumber cam being so profiled that in the first range 1cm of chart corresponds to 100 wavenumbers and in the second range corresponds to 50 wavenumbers. Vertical grid lines are marked along the entire chart and 200 steps of the chart stepper motor are required to advance the chart by 1cm. At this rate of chart advance, the individual steps are too small for the effect of the discontinuous motion to be observed in the trace.

It follows from the above that 56 × 200 or 11,200 stepper motor drive pulses are required to advance the calibrated chart by a full length. Whatever abscissa expansion is selected, this number of pulses will, of course, be required to transport the full 56 centimeters of chart; the abscissa expansion factor merely determines the rate at which the pulses are produced. Since the shortest scan time is six minutes, i.e., 360 seconds, and the maximum abscissa expansion X20, the number of seconds required to cover 56 centimeters at the highest steps-per-second rate must be 360/20=18 seconds and the steps per second 11,200/18 = 5,600/9. The frequency obtained by dividing the output frequency of oscillator 1 by 9 in divider 2, i.e., 622.2222 Hz, is therefore the correct timing frequency for establishing the X20 abscissa expansion, when the ABSCISSA EXPANSION unit 15 is set to X20, so as to pass the output frequency of selector 6 straight through selector 7 to pulse generator 14, and the SCAN TIME unit 5 is set to 6 minutes. The 622.2222 Hz frequency must clearly be divided by 20 in order to provide the correct timing frequency of 31.1111 Hz at the pulse generator 12 driving the wavenumber stepper motor SM1. Since the pulse generator 12 is connected to the output of the divider 11, a division by 20 is inherent in the connection. The X20 scale expansion in conjunction with a scan time of 6 minutes is thus established.

Operation of the SCAN TIME unit 5 to select the output frequency of divider 3 through selector 6, without altering the X20 setting, causes the 622.2222 Hz frequency to be divided by 2 before being divided by 20 in dividers 8 through 11. This gives a timing frequency of 15.5555 Hz at the pulse generator 12 and consequently doubles the scan time. A scale expansion of X20 with a scan time of 12 minutes thus results.

Finally, selection of the output frequency of divider 4 through selector 6 means that the 622.2222 Hz frequency is divided by 2 in divider 3 and by 4 in divider 4 before being divided by 20 as aforesaid. A timing frequency of 3.8888 Hz is now available at the pulse generator 12 and the scan time has therefore been increased by a factor of 8. This gives a scale expansion of X20 and a scan time of 48 minutes.

When the ABSCISSA EXPANSION unit 15 is set to select the output frequency of any one of dividers 8 through 11 via selector 7, the only change in any of the selections referred to earlier will be that the timing frequency at the pulse generator 14 will have altered compared with that serving the X20 abscissa expansion but the selected scan time will still apply. If the output frequency of divider 8 is selected, the timing frequency at the pulse generator 14 will be halved, giving therefore an abscissa expansion of X10. Similarly, the output frequency of divider 9 establishes the X5 abscissa expansion; and that of divider 10, which in conjunction with divider 8 gives a division by 10, establishes the X2 abscissa expansion. Finally, selection of the output frequency of divider 11 must bring in the X1 scale. It should be observed in passing that the selection of a possible frequency to suit desirable combinations of scan times and abscissa expansions is made easier when both scan times and abscissa expansion values are integers.

It is expedient in this junction to introduce certain explanations that will facilitate the correct interpretation of the FIG. 5 diagram. In accordance with well established practice, the lines shown in the diagram represent signal routes and not actual conductors. Some signal routes may be implemented by a plurality of conductors and some by a single conductor co-operating with a common earth return. Furthermore, a frequently used gate symbol has been adopted for AND and OR gates, an A within the symbol identifying the former and an O the latter. A number of selectors are shown in which each binary state of a control input indicated on the left of the box routes through to the output on the right one of the two inputs at the top. Each through route is denoted by a dotted line joining one input to the output. An arrow-headed lead line from the binary state represented by the notation 1 within the box, adjacent the control input, points to the through route enabled when logic state 1 is operative. Similarly, a lead line from notation 0 points to the route enabled when logic state 0 is operative. The binary state corresponding to the rest state is identified by the letter R in brackets. Selectors are also shown which have more than two inputs. No attempt has been made in the functional boxes representing them to indicate the binary logic that will select a given input, since the criterion for selection is unambiguous, as will be made clear later.

Having thus outlined the means for selectively controlling the speed of the wavenumber stepper motor 81, governing scan times, and the speed ratio between the two stepper motors, governing abscissa expansion modes (the manner in which the rotational direction is controlled will become apparent later in the description), the manner in which the system is arranged so that in passing from one abscissa expansion to another, the chart is automatically positioned will be described. This arrangement is such that if in the X1 mode, successive wavenumber intervals of, say, 100 wavenumbers, are represented by successive 1cm chart travel increments marked by calibrated grid lines on the chart, starting from the abscissa origin, in other abscissa expansion modes, each increment represents an exact fraction of the 100 wavenumber intervals as determined by the expansion factor selected. In other words, a 1cm increment representing 100 wavenumbers on X1, will represent 50 wavenumbers in X2; 20 in X5; 10 in X10;

and 5 in X20, as in the case of the mechanical embodiment hereinbefore described, with the difference, however, that the phasing operation is always performed automatically by the electrical system and, therefore, the operator is never compelled to reposition the chart by hand.

As noted above, the use of a calibrated chart is only practical in the X1 mode. Whenever passing from an expansion mode to the normal X1 mode, it is necessary to ensure not only that the phase relationship between the wavenumber drive and the chart drive is correct to give meaningful ordinate grid lines in accordance with the present invention but also that the trace on the chart starts at the chart abscissa reading corresponding exactly to the reading on the wavenumber dial of the spectrophotometer or the chart calibration will be meaningless.

Consider first of all the means included in the system depicted in FIG. 5 for switching abscissa expansions in accordance with the present invention when a chart provided with uncalibrated abscisssa grid lines as referred to earlier is in use. It will become evident, in particular, that these means include a phasing arrangement which, after the spectrum has been scanned in a given abscissa expansion up to a given wavenumber value, ensures that the recording of the spectrum in a new abscissa expansion will commence from an abscissa grid line if the number of 100-wavenumber blocks in that wavenumber value multiplied by the incoming abscissa expansion factor gives an integer and it will commence from a location between successive abscissa grid lines if it leaves a remainder, with the location actually representing said remainder.

In FIG. 5, a counter 16 is driven by the output of selector 6; counter 17, by the output of divider 8; counter 18, by that of divider 9; counter 19, by that of divider 10; and counter 20, by that of divider 11. All counters are made to cycle at each block of 200 counts, i.e., upon the occurrence of the 200th step, the counters reset to zero. Since 200 pulses are required by the stepper motor 82 for advancing the chart by 1 centimeter, a full count in counter 16 represents the scanning of 5 wavenumbers for a chart advancement of 1 centimeter (abscissa expansion X20); a full count in counter 17 represents 10 wavenumbers per centimeter of chart (abscissa expansion X10); a full count in counter 18 represents 20 wavenumbers per centimeter of chart (abscissa expansion X5); a full count in counter 19 represents 50 wavenumbers per centimeter of chart (abscissa expansion X2); and a full count in counter 20 represents 100 wavenumbers per centimeter of chart (abscissa scale X1).

It is therefore clear that if all counters 16 to 20 are reset to zero at the scan origin, such as by reversing the scan drive just past the scan origin on first switching on the spectrophotometer, so that upon passing the scan origin in forward scan drive a device 21 resets all counters as coincidence is established between scan origin and chart origin in a manner to be described later, the count thereafter accumulating in the counter associated with the abscissa expansion in use as the instrument scans up to a given wavenumber value identifies the location on a grid line or somewhere between successive grid lines of the point of contact between the recording pen and the chart which correctly represents the terminal wavenumber unit of that value in the scale of the abscissa expansion in use, and the count simultaneously accumulating in each of the remaining counters identifies where the point of contact ought to have been if the associated abscissa expansion had been in use. Counters 16 to 20 may, therefore, be regarded as intercorrelated scale tracking counters reminiscent of the constant-mesh gear trains referred to in the earlier description of a mechanical embodiment of the present invention. Naturally, the counters must be able to count up or down to maintain proper tracking in both the forward and reverse directions of the wavenumber drive and this has in fact been allowed for through a sense signal available to them all from the selector 22, the operation of which will be presently described.

The output of each scale tracking counter is lead to a selector 23 which responds to the abscissa expansion selection effected through control unit 15 by routing the outputs of the counter corresponding to the selected abscissa expansion to a comparator 24, to which there are also routed the outputs of a counter 25, receiving the timing frequency for the stepper motor 82 emerging from the OR gate 13 and a "count up" or "count down" signal from the selector 22. Counter 25, which along with counters 16 to 20 is reset to zero after first switching on the instrument, is arranged to cycle every 200 steps of the stepper motor 82, i.e., every 200 pulses of the timing frequency to drive pulse generator 14.

When the spectrophotometer is scanning, the reading accumulating in counter 25 must keep pace with and have the same significance as the reading accumulating in the scale tracking counter associated with the abscissa expansion actually in use. When the scan is momentarily interrupted to effect a scale change, the reading in the scale tracking counters is "frozen". The phasing operation simply consists in displacing the chart until the reading in counter 25 is equal to the frozen reading in the scale tracking counter of the desired incoming scale. Counter 25 may therefore be thought of as the scale phasing counter.

The phasing operation will now be considered in some detail. If, for example, the instrument has scanned from 4000cm$^{-1}$ to 2812cm$^{-1}$ in the X2 mode, the terminal counter in the X2 tracking counter 19 must be that which has accumulated since the counter last reset to zero, which is the same thing as saying that which has accumulated since the last 50-wavenumber block started, i.e, 2850cm$^{-1}$. From 2850cm$^{-1}$ to 2812cm$^{-1}$, there are 38 wavenumbers, which translated into pulses in X2 correspond to $2 \times 2 \times 38 = 152$ pulses, and 152 will in fact be the reading of the X2 counter 19 at 2812cm$^{-1}$. Incidentally, the same reading would have of course occurred at $2812 + 50 = 2862$cm$^{-1}$. In fact, the counter would have reset correspondingly to 2900cm$^{-1}$ and $2900 - 2862 = 38$ wavenumbers would have again passed giving once more an X2 counter 19 reading of 152.

If at 2812cm$^{-1}$, it is desired to switch X20, it is necessary to first of all consider the X20 counter. It last reset to zero at 2815cm$^{-1}$, which is 3 wavenumbers upscan from 2812cm$^{-1}$. Three wavenumbers in X20 is equivalent to $2 \times 20 \times 3 = 120$ pulses. For proper phasing up, therefore, the system must advance the chart up to a position 120 pulses downscan of a grid line. The reading in the phasing counter 25 is 152 so 48 pulses are needed to reset it plus the 120 pulses for correct phasing of the X20 scale, a total of 168 pulses.

It is now possible to outline the sequence of events when scanning at a selected scan time and a selected abscissa expansion. To simplify matters, it will be assumed that the wavenumber drive is positioned so that the scan origin is about to be passed in a forward scan direction to allow the resetting of the counters as described.

The scan time and the abscissa expansion required are first set in control units 5 and 15, respectively. Normal forward scan is then selected in the NORMAL/FORWARD/REVERSE unit 26 wherein FORWARD selection gives a logic output state of 0 and REVERSE selection a logic output state of 1.

The output state of unit 26 is routed through the selector 27 to the rotary sense selector 22 when the control input of selector 27 is in the 0 state. This control input us taken from the output of OR gate 28 which is in a rest state of 0 if neither of its two inputs 29A and 29B from the FAST FORWARD/REVERSE unit 29 is at 1, which is in fact the case, as shall be appreciated later, if neither fast motion is selected. Since normal forward motion has been selected through unit 26, the output of OR gate 28 is at 0. This means that the 0 state of unit 26 is transferred through selector 27 to the left-hand input of rotary sense selector 22. For reasons that will become clear as the description proceeds, the control input of selector 22 is at 1 at this time so that the 0 state from selector 27 will be transferred to the output of selector 22 and finally to the pulse generators 12 and 14, wherein the 0 state commands forward motion and the 1 state reverse motion. The output state of OR gate 28 has also a control functon on selector 6, in that when OR gate 28 is in the 0 state, selector 6 is preconditioned for selecting any of the outputs from dividers 2, 3 and 4. The function of its other state will be explained later.

Having thus set up the scan time and the abscissa expansion required as well as the forward direction of scan, it is now time to switch on the ON/OFF scan control 30. When control 30 is on, its output state changes from 1 to 0, is inverted to 1 by inverter 31 and fed to the AND gate 32, where it represents one of two inputs for gating through the output of divider 2. The second input is obtained from the output of selector 33 which, as shall be seen is in a state of 1 if equality between the scale phasing counter 25 and the scale tracking counter associated with the selected abscissa expansion is established by comparator 24. Since the instrument is moving from the scan origin, where all counters have been reset to zero, equality is in fact established and therefore the second input to AND gate 32 is in fact at 1.

Gate 32 is thus enabled and timing pulses are made available which through the selection carried out in units 6 and 7 ensure that corresponding drive pulses are generated to cause the stepper motor 81 to rotate in accordance with the scan time selected and to cause the stepper motor 82 to rotate at a speed ratio relative to 81 corresponding to the abscissa expansion selected.

As long as no change in the abscissa expansion mode is made by the operator of the spectrophotometer and no instrument malfunction occurs, the phasing counter 25 and the tracking counter serving the mode in use must show the same count, as was indicated earlier. It will become evident that when such is the case the comparator 24 will cause no phasing action to be taken.

Assume that X2 was the abscissa mode initially selected and that the infrared spectrum of a sample under analysis has been scanned from the origin at 4000cm$^{-1}$ to 2810cm$^{-1}$ where the ON/OFF control 30 has been turned off, i.e., changed its output state to 1, with the result that gate 32 is not disabled, so that no timing pulses are available for driving the stepper motors. Assume that it is now wished to resume forward scanning from 2810cm$^{-1}$ in the X5 mode.

The FORWARD/REVERSE control 26 will be left at the FORWARD position and the scan time selection unaltered. The X5 mode is selected by depressing the appropriate button in ABSCISSA EXPANSION control unit 15. It is now time to turn on the scan switch 30. But before this is done, consideration may be given to the state of the X2 counter 19, the X5 counter 18 and the counter 25 at the moment the scan was stopped at 2810cm$^{-1}$.

Bearing in mind that the scanning of 100 wavenumbers corresponds to 200 pulses having passed to the X1 counter, i.e., 2 pulses per wavenumber, scanning from 4000cm$^{-1}$ to 2810cm$^{-1}$, i.e., 1190 wavenumbers, means that $1190 \times 2 = 2380$ pulses have passed to the X1 counter, or $2380/200 = 11.9$ blocks of 200 pulses. The X1 counter must read, therefore, 0.9 of a block of 200, i.e., 180. Consequently, the X2 counter must have received $11.9 \times 2 = 23.8$ blocks and will read 0.8 of a block, i.e., 160, and the X5 counter must have received $11.9 \times 5 = 59.5$ blocks and will read 0.5 of a block, i.e., 100. While scanning in X2 mode, the counter 25 kept pace with the X2 counter 19, so at the moment of switching over to X5, the comparator 24 "sees" the 100 count in scale tracking counter 18 through the selector 23 and the 160 count in scale phasing counter 25.

Now, the logic of comparator 24 is so arranged that, as long as its two inputs, which will be identified as input A from selector 23 and input B from counter 25, are equal, output lines 24A and 24B will both be at state of 1. The 1 state of output 24A is transferred to the output of the selector 33 (the function of which is to be explained later) which as shown has a rest state of 0. The output of selector 33 is, therefore, in the 1 state as long as there is equality between the A and B inputs. Since the control input of selector 22 and the enabling input of gate 32 are connected to the output of selector 33, they too will be in the 1 state in the stated circumstances. When equality between A and B is not established, as on first switching from abscissa expansion X2 to abscissa expansion X5, the output state of line 24A changes from 1 to 0 and this is communicated to the output of selector 33 causing three almost simultaneous events: (a) the AND gate 32 is turned off, thus temporarily preventing the timing frequency for the selected scan time from appearing at the output of unit 6 and consequently the selected abscissa expansion timing frequency from appearing at the output of unit 7; (b) the control function of selector 22 changes to state of 0 and the forward command from the output of selector 27 is no longer routed through to units 12 and 14 respectively. The output of AND gate 34 is coupled through instead (the consequence of this will be evident below); and (c) the output state of inverter 35 connected to AND gate 36 changes from 0 to 1.

AND gate 36, another input of which is permanently connected to the output of divider 2, is now able to pass pulses from divider 2 through the OR gate 13 to the unit 14 feeding drive pulses to the chart stepper motor 82. The direction in which the motor 82 will run, because of the switch from state 1 to state 0 of the function controlling selector 22, is governed by the output state of the AND gate 34. This gate receives an input with a rest state of 1 from unit 37 (the function of which is to be described) and an input with a rest state of 0 from unit 38 (the function of which is also to be described) so that unless the rest state is changed to a 1 in unit 38, the output of the AND gate 34 will be a 0, which transferred to unit 14 will cause the chart to drive forward for the purpose of equalizing the A and B inputs in comparator 24, whether A is greater than B or vice versa. When using a continuous uncalibrated chart, there would be little point in driving the chart back to establish equality between the A and B inputs in the case of B being greater than A. It is far more logical and convenient to move the chart forward. The need for driving the chart back does, however, arise where a calibrated chart is used and the analyst wishes to scale expand certain sections before returning to the X1 calibrated mode of operation without moving on to the next calibrated chart.

It is thus seen that on switching over from the X2 to the X5 abscissa expansion mode, the stepper motor 82 is caused to advance the chart quickly until the count in the scale phasing counter 25 has changed to 100 (after going through 0, of course) which is the count in the X5 scale tracking counter 18 at $2810 cm^{-1}$. Since 1cm of chart travel requires 200 pulses at the 82 stepper motor, 140 pulses must correspond to a chart displacement of $140/200 = 0.7$cm. It is now apparent that even taking the extreme situation that could be encountered, wherein the counter 25 read 1 and the tracking counter associated with the incoming abscissa expansion read 0, the phasing operation would require moving the chart forward by one 1cm.

It is perhaps worth emphasing that at $2810cm^{-1}$, the concern was for representing 10 wavenumbers in the X5 mode. It has been shown that advancing the chart so as to accumulate a count of 100 in counter 25 achieves proper phasing in passing from X2 to X5. Now, insofar as there must be 2 pulses per wavenumber, the 10 wavenumbers referred to correspond to 20 pulses which multiplied by 5 (because of the X5 mode) make 100 pulses, so the 100 count is correct and the corresponding point of contact between recording pen and chart correctly represents 10 wavenumbers in X5.

Once equality of the A and B inputs of comparator 24 is established, the state of output 24A will change back from 0 to 1 with the result that AND gate 32 will be enabled, AND gate 36 disabled and the selector 22 will again pass the forward command coming through the selector 27. The wavenumber stepper motor 81 and the chart stepper motor 82 are now driving forward in the normal scan mode and in the correct speed ratio as governed by the X5 abscissa expansion.

As an optional operational refinement, the 1 state at the output of inverter 35 (corresponding to a 0 state at output 24A of comparator 24) may be made to cause the recording pen to lift through the pen actuator 39 and to be lowered again when inverter 35 changes to 0. This will ensure that the trace in the new abscissa expansion commences from the very point on the chart that is correctly phased for the new scale.

It is now clear that it is not necessary to operate the scan switch 30 whenever the abscissa expansion needs to be altered. Switching over to a new expansion will take place either without interruption of the trace or more often with an interruption varying in length in relation to the count to be made up in the scale phasing counter 25, as has been seen.

If it is desired to restart the trace not at the next permissible chart position but much further on, the FAST FORWARD/REVERSE control 29 may be operated before the new abscissa expansion is selected. When the control is inoperative, in the sense that neither motion is selected, the two output lines 29A and 29B of unit 29, are both in state of 0, which places the output of the OR gate 28 in the 0 state also, as described above. In fact, unit 29 may be imagined as a centerbiased switch enabling either of two circuits to be made by momentarily urging the switch lever to the left or to the right, the lever flying back to the neutral center position, where neither circuit is selected, when the operator releases the pressure on it. If forward motion is selected, the output on line 29A is placed in the 1 state and the output on line 20B in the 0 state, and vice versa if the reverse motion is selected. If either motion is selected, therefore, the output of OR gate 28 is in a state of 1. This output performs two control functions: it changes the control input of unit 6 from 0 to 1, so that regardless of the scan time that was selected only pulses from divider 2 are routed through the selector 6; it also changes the control state of selector 27 from 0 to 1 so that the output state of line 29A is transferred through the selector 27 to the selector 22.

It must naturally be assumed that the inputs A and B to comparator 24 are equalized when selecting the Fast Forward motion since up to that point in time, the instrument has been operating in the normal scan mode. The control of selector 22 is therefore in a state of 1 and this means that the output stage of 27 can pass right through to units 12 and 14. As noted above, the state of 29A is 1 for reverse motion and 0 for forward motion and units 12 and 14 respond to a 0 input by causing motors 81 and 82 to rotate correspondingly in a forward direction.

Upon interrupting the Fast Forward command, the output of OR gate 28 reverts to 0 and the new abscissa expansion may then be selected. Simultaneously, the scan time previously in operation is restored.

The operation of the abscissa expansion facilitates so far considered applies when an uncalibrated chart is used or a calibrated chart is used in the uncalibrated mode. The manner in which it is possible, when a calibrated chart is fitted, to transfer from any abscissa expansion value to the calibrated abscissa mode will now be described. This kind of operation will be referred to as the X1 lock-mode.

In addition to the scale phasing counter 25, which cycles at each block of 200 pulses fed to stepper motor 82, there is an X1 lock-mode phasing counter 40, driven by counter 25, which accumulates the number of blocks supplied to motor 82 when the chart is made to travel in a forward direction and subtracts, from the count accumulated, those supplied when the chart is reversed. Similarly, there is an X1 lock-mode scale tracking counter 41 which likewise counts up or down the number of 200-pulse blocks passing through the X1 scale tracking counter 20. The counter 41 effectively represents the number of 100-wavenumber intervals passed from the scan origin.

The outputs of counters 40 and 41 form the A' and B' inputs, respectively, of X1 lock-mode comparator 42. The phasing operation required when switching over from any abscissa expansion to the X1 lock-mode essentially involves the equalization of the A' and B' inputs of comparator 42 as well as that of the A and B inputs of comparator 24. Comparator 42 provides a 0 output on line 42A if the A' and B' inputs are not equal (and naturally a 1 output if they are equal) and a 0 output at 42B if the count of counter 41 is the greater (and naturally a 1 if there is no equality of counts). Reverting to comparator 24, it was already mentioned that the output on line 24A is in a 0 state if the two counts compared are not equal. In addition, there is a further output line 24B at a 0 state if the count of the scale tracking counter in use is greater than that of the scale phasing counter 25. Output lines 24B and 42B are routed to a selector 43 which, depending on whether the controlling signal from output line 42A, inverted by inverter 44, is a 0 or a 1, will route through the outputs on lines 24B and 42B, respectively.

Output line 24A of comparator 24 forms a first selectable input of selector 33 and the output line 42A of comparator 42 via AND gate 45 forms a second selectable input. In addition to the input line 42A, AND gate 45 receives as another input line 24A.

If the state on line 24A is transferred to the output of selector 33, the normal unlocked operation as already described is effective, with automatic positioning of the chart in passing from one to another abscissa expansion. If the X1 lock mode is activated, the state on line 42A is passed through. Whether one or the other input to unit 33 is routed through depends on the state of the X1 LOCK unit 38. When the X1 lock mode is not selected, the output state of unit 38 is 0 and this results in the input on line 24A being passed through. When the X1 mode is selected, the output state of unit 38 is 1 and this will gate through the input on line 24A.

Assume that after scanning a portion of the spectrum in the X2 mode the operator wishes to engage the X1 lock mode. When ready to do so, he will select the X1 mode in unit 15 and at the same time select the X1 lock mode in unit 38 (although the two units have been shown as quite separate), in practice, it would be found convenient to arrange the controls so that both can be operated in one operation, if the operator so wishes, e.g., by having two push buttons side by side so that they can be spanned by one finger width, one being the X1 abscissa expansion selection button and the other the X1 lock button.

The count in counter 41 is clearly going to be smaller than that in counter 40 when the X1 lock mode is selected and this means that a 0 state must appear at the output 42A of comparator 42. The 0 state must also appear at the output line of unit 33 and this will:

a. disable the gate 32, thus preventing the wavenumber stepper motor 81 from receiving drive pulses;
b. enable the gate 36 through a state inversion at inverter 35, which causes the recording pen to be lifted by unit 30 and pulses from unit 2 to reach unit 13 through OR gate 13; and
c. cause the selector 22 to route through to units 12 and 14, respectively, the output state of the AND gate 34, so that for the time being, the command from the unit 26 is interrupted.

It is clear that the output state of AND gate 34 will determine whether the chart stepper motor 82 moves the chart forward, correspondingly to state 0, or backward, correspondingly to state 1. In the situation that has been envisaged, a 1 is in fact required. AND gate 34 is provided with three inputs: a state-1 input from unit 38 (changing to a state-0 input when the X1 lock is not selected); a state-1 input from the unit 37 when it is not activated, (changing to 0 when it is activated; the function of this unit will be described later) and an input from the selector 43. The direction of rotation of motor 82 is now seen to depend on the output state of selector 43. Now, since the B input of comparator 24 is greater than A and the B' input of comparator 42 is greater than A' when changing from the X2 abscissa expansion mode to the X1 lock mode, the output states on lines 24B and 42B, respectively, will be 1. With the control state of unit 43 at 1 (there is a 0 state out of comparator 42 and this is changed to 1 by inverter 44), the output from 42B is routed through, which means that the AND gate 34 has an output state of 1 as required. The chart is now run back until there is equality as sensed by comparator 42 between its A' and B' inputs so that the output state on line 42A changes from 0 to 1. The control input at selector 43 will now change from 1 to 0, thus routing through the input on line 24B. If it is assumed that equality between inputs A and B of comparator 24 is not yet established, the state of 24B will stay at 1 and this means that the system is still preconditioned for reverse chart drive. The pulses from divider 2 are still coming through AND gate 36 because the AND gate 45 still has an output state of 0 since one of its inputs is from line 42A. When comparator 42 senses the equality of inputs has taken place, the output state of gate 45 changes to 1 because the output of comparator 42A has changed to 1 and this causes:

a. the AND gate 36 to be disabled, thus cutting off the pulses from divider 2;
b. the AND gate 32 to be enabled, thus allowing the normal timing frequencies for the two stepper motors to be routed through;
c. the selector 22 to select the output state of selector 27 which will have been left at 0 since unit 26 was set for normal forward drive and would have been left unaltered during the switch to the X1 lock mode; and
d. the recording pen to drop on the chart.

If it is not desired to run the chart back but to move instead to the next section of calibrated chart, this can be done by changing the output state of unit 37 from a 1 to a 0 and thus causing forward movement of the chart until the next section is reached when on releasing the control in unit 37, the lock is established in the manner described.

It will be noted that the output of inverter 35 is extended to the pen actuator 39 through an OR gate 46 which is provided with three further inputs; one from the output of OR gate 28 so that the pen is automatically lifted when Fast Forward or Reverse is selected; one from the output of unit 26 to lift the pen on Normal Reverse drive; and one from the output of the Pen Lift unit 47 which on depressing a button produces an output state of 1 and thus enables the operator to lift the pen when he so desires for any reason.

The system of FIG. 5 is particularly suitable for taking care of a further useful refinement in a comparatively simple manner. It provides the facility for automatically advancing the scan at a rapid rate to any selected wavenumber reading within the scan range by simply setting the wavenumber reading required through the operation of appropriate digit switches in the WAVENUMBER SELECT unit 48 and depressing momentarily a button in the DRIVE TO WAVENUMBER SELECTED unit 49. The operation which ensues is as follows: the output state of unit 49 changes from 1 to 0 and this causes the latch 50 to come on and place a 1 state at one input of AND gate 51, the other input of which is derived from the output of a comparator 52 which is in a state of 1 if the wavenumber selected through unit 48 is not equal to the wavenumber reading given by counters 20 and 41 together. With two state-1 inputs established, the AND gate 51 imposes a 1 output state on OR gate 28 which causes pulses from divider 2 to be routed through for the fast operation of both stepper motors. When equality of inputs is established in comparator 52, its output state changes to 0 and this disables the AND gate 51, so that pulses direct from divider 2 are no longer coupled through and normal scan as previously selected may take place from the selected wavenumber, and at the same time unlatches the latch 50.

Figure 6:
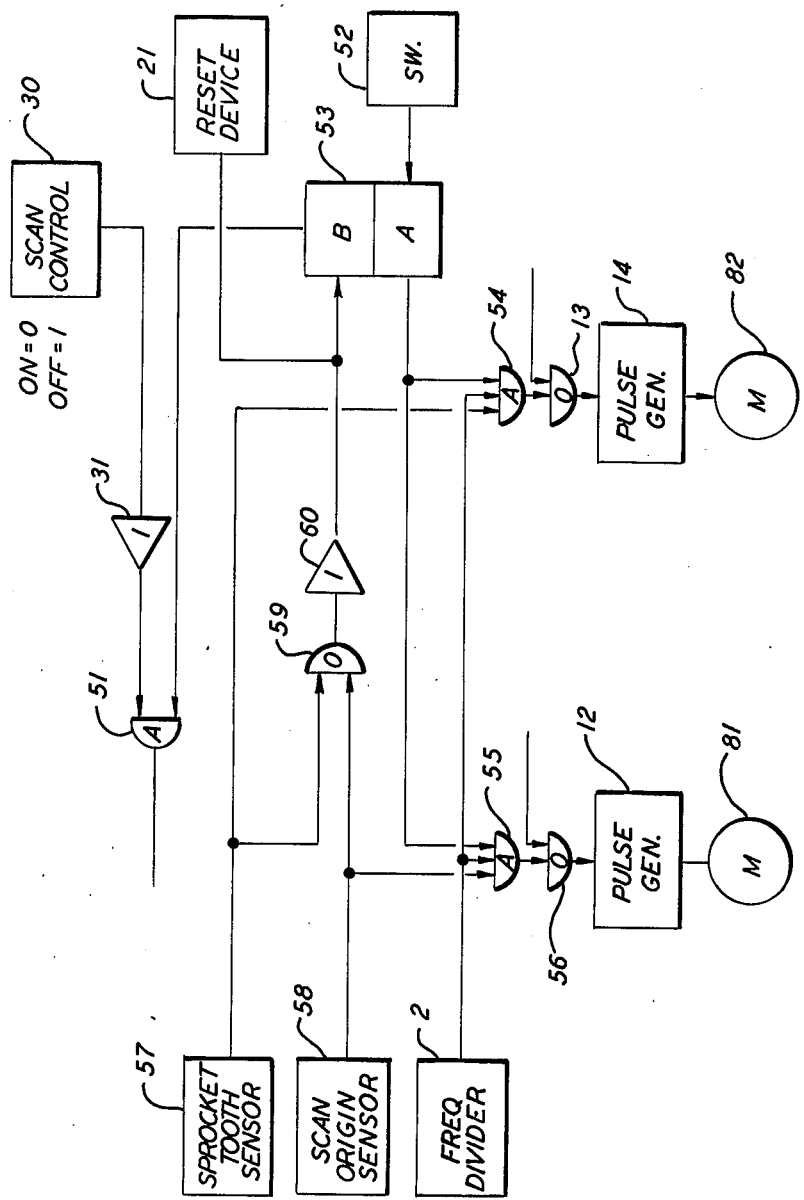

FIG. 6 is a block-logic diagram illustrating the arrangement for ensuring that after first switching on the spectrophotometer and reversing the wavenumber drive past the scan origin actual scanning cannot commence upon selecting forward drive unless there is coincidence with a grid line when the scan origin is reached and unless the reset device 21 has operated. Although there is only one grid line that can be used as the chart origin in the calibrated X1 mode, lining up on any grid line presents no real inconvenience to the operator who would immediately spot any discrepancy with the wavenumber dial in the X1 mode and reposition the chart if necessary. In fact, he could, as a matter of routine, replace the chart after lining up.

It will be assumed that the chart to be used with the spectrophotometer is provided with sprocket perforations each of which is bisected by a grid line. What must, therefore, be ensured is that at the scan origin, a sprocket tooth is uppermost and bisected by a plane which also bisects the tip of the recording pen.

In the diagram of FIG. 6, those functions depicted in FIG. 5 which are needed for a proper understanding of the lining up arrangement are shown again. To facilitate identification, their reference numbers have been left unchanged.

In FIG. 6, the SCAN ON/OFF control unit 30 is temporarily overridden by means of an AND gate 51 located after the inverter 31. The control input of AND gate 51 is at 0 until the lining up procedure has been completed, when normal operation as described in FIG. 5 can take place.

Upon reversing the wavenumber drive past the scan origin, a unit 52 which could be a microswitch or similar device, reverses its output state from 0 to 1 and this causes a latch device 53 to have an output state of 1 in the lower section A and, therefore, an output state of 0 in the upper section B. The section A state 1 output enables the AND gate 54 to pass highrate pulses from divider 2 through the OR gate 13 to the drive pulse generator 14 supplying chart stepper motor 82. The other input to OR gate 13 is the one also shown in FIG. 5. The section A state 1 output also enables AND gate 55 to pass pulses from the divider 2 through the OR gate 56 to the drive pulse generator 12 supplying the wavenumber stepper motor 81. The other input to OR gate 56 is the line shown in FIG. 5 which feeds straight into the drive pulse generator 12. The enabling function of the section A state 1 output in so far as AND gate 54 is concerned takes place when the output of unit 56 for sensing the uppermost position of each sprocket tooth is at state 1, indicating that an uppermost position has not occurred; and in so far as AND gate 55 is concerned, this function takes place when the output of unit 58 for sensing the scan origin is also at state 1, indicating that the scan origin has not yet occured.

The state 0 output of section B merely disables AND gate 51 until the latch 53 is unlatched.

Now, when the output state of both unit 57 and unit 58 changes from 1 to 0 to indicate that the two stepper motors have moved far enough to establish an uppermost positioning of a sprocket tooth and the occurrence of scan origin, respectively, the output state of OR gate 59 will be 0 and this inverted by inverter 60 serves to unlatch the latch 53. Now, AND gate 51 is enabled and AND gates 54 and 55 are disabled. Simultaneously, the reset 21 becomes effective in resetting all counters shown in FIG. 5 and normal operation as described with reference to that figure commences.

What is claimed is:

1. Apparatus for obtaining a change in speed ratio to control a scale change comprising:
    (a) a first displaceable member;
    (b) a second displaceable member;
    (c) speed transfer means operatively relating in motion to said first displaceable member for controlling the rate of relative displacement between the two members so as to enable any one of a predetermined range of speed ratios to be established therebetween corresponding to a desired scale in which the displacement of said second member is to be represented relative to the displacement of said first member;
    (d) means for selecting a desired speed ratio; and
    (e) phasing means which, accounting for a selected speed ratio, enable the relative displacement of the two displaceable members to be adjusted in operation with repeatable accuracy before said selected speed ratio and therefore the corresponding scale is enabled so that, given a basic displacement step of the first displaceable member, successive displacement steps of said first displaceable member from a positional origin thereof, each representing an exact fraction or multiple of said basic displacement step that is determined by the selected scale expansion or compression, respectively, always correspond to successive equal and invariable displacement steps of the second displaceable member from a positional origin thereof no matter where the speed change takes place past the positional origin of said first displaceable member.

2. Apparatus according to claim 1, wherein decreasing speed ratios between said first and said second displaceable member represent increasing scale expansions.

3. Apparatus according to claim 2, wherein the highest scale expansion is provided through a speed ratio of 1:1.

4. Apparatus according to claim 2, wherein said range of speed ratios include a ratio providing scale compression by dividing down the speed ratio associated with a normal unexpanded scale.

5. Apparatus according to claim 1, wherein said phasing means comprise means to enable the relative displacement of the two displaceable members to be adjusted by moving one displaceable member relative to the other by not more than the basic displacement step.

6. Apparatus according to claim 5, wherein said phasing means adjust the relative displacement automatically upon selection of a speed ratio and before the corresponding scale becomes operative.

7. Apparatus according to claim 1, wherein:
    (a) said first displaceable member is the movable member of a first stepper motor;
    (b) said second displaceable member is the movable member of a second stepper motor;
    (c) means are provided for supplying drive pulses of at least one frequency to said first stepper motor;

(d) said speed transfer means comprise means for dividing down said frequency into a range of sub-frequencies for driving the second stepper motor; and (e) said means for selecting comprise means for selecting one of said sub-frequencies at a time and routing it to said second stepper motor.

8. Apparatus according to claim 7, wherein said phasing means comprise:

(a) means associated with each scale for continuously keeping track of the correct position in relation to said scale of the second stepper motor movable member within each of said successive equal and invariable displacement steps thereof;

(b) means for continuously tracking the actual position of said second stepper motor movable member, (c) comparator means for comparing said correct and actual positions; and (d) means for causing drive pulses to be fed to one stepper motor and not to the other to equalize in operation the two positions if they are not equal when a new scale is selected and for causing both stepper motors to be supplied with drive pulses when equality has been established.

9. Apparatus according to claim 7, wherein said means for supplying drive pulses to said first stepper motor supply drive pulses having a frequency which is selectable within a predetermined range of frequencies.

10. Apparatus according to claim 7 and further including separate means for simultaneously tracking the absolute displacement of said first and second stepper motor movable members, respectively, each from its positional origin, means for comparing the two aboslute displacements, and means for causing drive pulses to be fed to one stepper motor and not the other if the two tracked absolute displacements are not equal and for causing drive pulses to be fed to both stepper motors after the two absolute displacements have been made equal.

11. Apparatus according to claim 10, and further including means for presetting a desired value of absolute displacement of the first stepper motor movable member, means for comparing said desired value and the tracked absolute displacement of the said member, and means for causing drive pulses to be fed to the first stepper motor only until the preset and tracked absolute displacements are made equal if they do not happen to be equal.

12. Apparatus according to claim 7, wherein the two stepper motors are rotary stepper motors, said movable members being the two rotary shafts of said motors and wherein said means for tracking include at least one counter.

13. Apparatus according to claim 1, wherein said phasing means comprises a plurality of positive clutches one being provided for each speed ratio, each clutch including a first part referenced in motion to the first displaceable member, a second part referenced in motion to the second displaceable member and means permitting said parts to engage only at predetermined equal displacement intervals of one part relative to the other from a point of permissible connection to the next point of permissible connection, said intervals being governed by the speed ratio served by said clutch and therefore the corresponding scale selected.

14. Apparatus according to claim 13 wherein said speed transfer means comprise a plurality of constant mesh gear trains and wherein said positive clutches are rotary clutches, each gear train providing one speed ratio and each positive rotary clutch enabling the two displaceable members to be drivingly connected through a gear train.

15. Apparatus according to claim 14, wherein one part of each rotary positive clutch includes circumferentially spaced apertures and the other part includes a pin adapted to engage any one of said apertures.

16. Apparatus according to claim 15, wherein said means for selecting comprises electromagnetic means to selectively control the engagement of the pin in the clutch associated with the selected speed ratio into any of the apertures of that clutch.

17. Apparatus according to claim 13, wherein each of said displaceable members is a rotary shaft.

18. Apparatus according to claim 1, wherein said apparatus forms part of a chart recorder including a marking device for recording a trace on the chart.

19. Apparatus according to claim 8, wherein said apparatus forms part of a chart recorder including a marking device for recording a trace on a chart.

20. Apparatus according to claim 13, wherein said apparatus forms part of a chart recorder including a marking device for recording a trace on a chart.

21. Apparatus according to claim 18, wherein said chart recorder is a strip chart recorder associated with a scanning spectrophotometer and wherein the displacement of the first displaceable member represents the scanned quantity and the displacement of said second displaceable member represents chart transport.

22. Apparatus according to claim 21, wherein said chart recorder includes a sprocket for engaging a perforated strip chart and wherein said sprocket is coupled to said second displaceable member for rotation therewith, a pair of sprocket teeth on said sprocket defining the limits of each of said equal and invarible displacement steps.

* * * * *

UNITED STATES PATENT OFFICE
CERTIFICATE OF CORRECTION

Patent No. 4,073,198      Dated February 14, 1978

Inventor(s) Michael Alan Ford

It is certified that error appears in the above-identified patent and that said Letters Patent are hereby corrected as shown below:

Column 2, line 46 after "consequently" insert -- , --.

Column 14, line 25 change "just" to -- must --.

Column 25, line 57, change "56" to -- 57 --.

Column 3, line 26, change "number" to wavenumber --.

Column 6, line 63, change "x5" to -- X5 --.

Signed and Sealed this

Sixteenth Day of January 1979

[SEAL]

Attest:

RUTH C. MASON
*Attesting Officer*

DONALD W. BANNER
*Commissioner of Patents and Trademarks*